United States Patent [19]

Cho

[11] Patent Number: 5,779,483

[45] Date of Patent: Jul. 14, 1998

[54] APPARATUS FOR GUIDING HAND-ACUPUNCTURE

[75] Inventor: Young Yim Cho, Seoul, Rep. of Korea

[73] Assignee: Hoon Kwak, Seoul, Rep. of Korea

[21] Appl. No.: 653,582

[22] Filed: May 24, 1996

[51] Int. Cl.[6] .................................................. G09B 23/28
[52] U.S. Cl. .................................................. 434/262; 434/267
[58] Field of Search ............................. 128/735, 907; 606/189, 204; 434/131, 145, 267

[56] References Cited

U.S. PATENT DOCUMENTS

| | | | |
|---|---|---|---|
| 4,323,351 | 4/1982 | Goldsmith | 434/274 |
| 5,366,379 | 11/1994 | Yang et al. | 434/365 |
| 5,519,809 | 5/1996 | Husseiny et al. | 395/2.84 |

FOREIGN PATENT DOCUMENTS

| | | |
|---|---|---|
| 86202445 U | 8/1987 | China . |
| 2055626 U | 4/1990 | China . |
| 2065783 U | 11/1990 | China . |
| 2093428 U | 1/1992 | China . |
| 2127198 U | 2/1993 | China . |
| 2142218 U | 9/1993 | China . |
| 1090411 A | 8/1994 | China . |
| 8801592 Y1 | 5/1988 | Rep. of Korea . |

OTHER PUBLICATIONS

Parapsychology, "Acupuncture Model", 1975.

*Primary Examiner*—Richard J. Apley
*Assistant Examiner*—John Edmund Roynak
*Attorney, Agent, or Firm*—Banner & Witcoff, Ltd

[57] ABSTRACT

Disclosed is an apparatus for guiding hand-acupuncture, which comprises at least a hand model having a plurality of light emitting means respectively mounted in the spots corresponding to the hand-acupuncture points, a human body model having a plurality of light emitting means mounted in the positions of the parts of a human body cured by practicing the hand-acupuncture to corresponding hand-acupuncture points, a microprocessing unit programmed in a given code to represent the hand-acupuncture points corresponding with the parts of the body affected with various kinds of diseases, an input means for entering code signals into the microprocessing unit according to the code system, a connecting means for connecting the output signals of the microprocessing unit with the light emitting means, and a support frame for supporting the body model and hand model. If code signals are entered into the microprocessing unit according to the code system, the corresponding light emitting means of the body model and hand model are turned on to emit light under the control of the microprocessing unit.

9 Claims, 2 Drawing Sheets

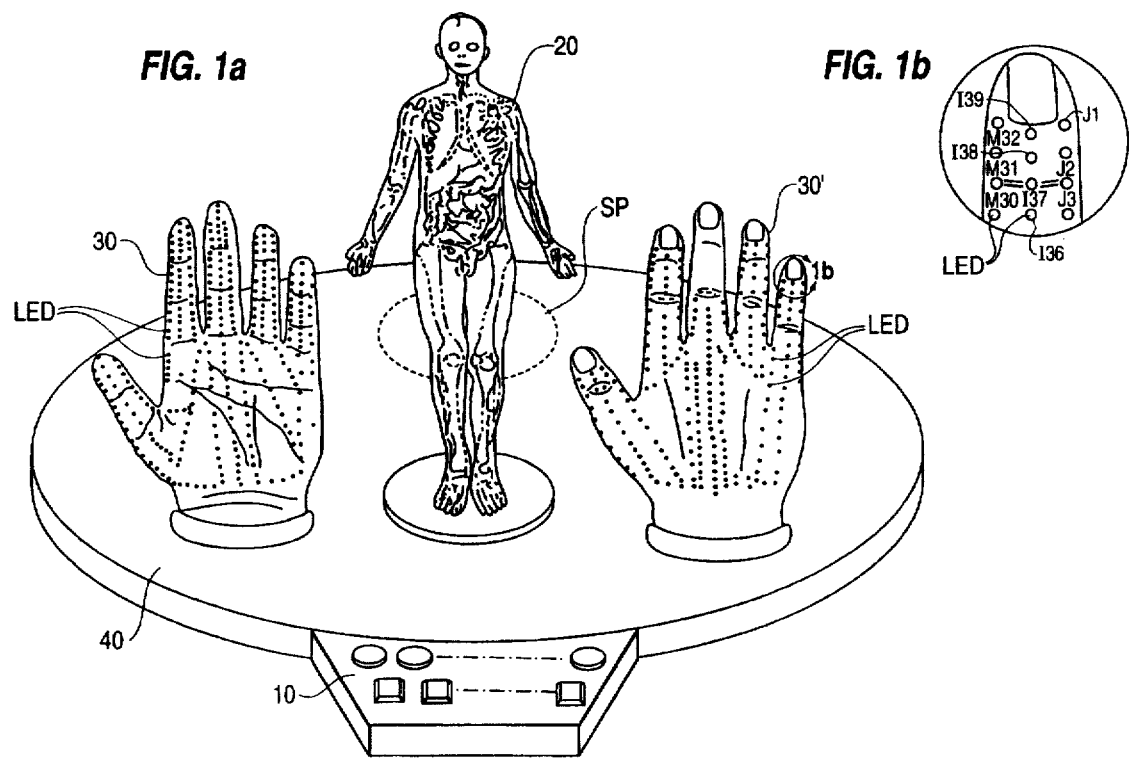

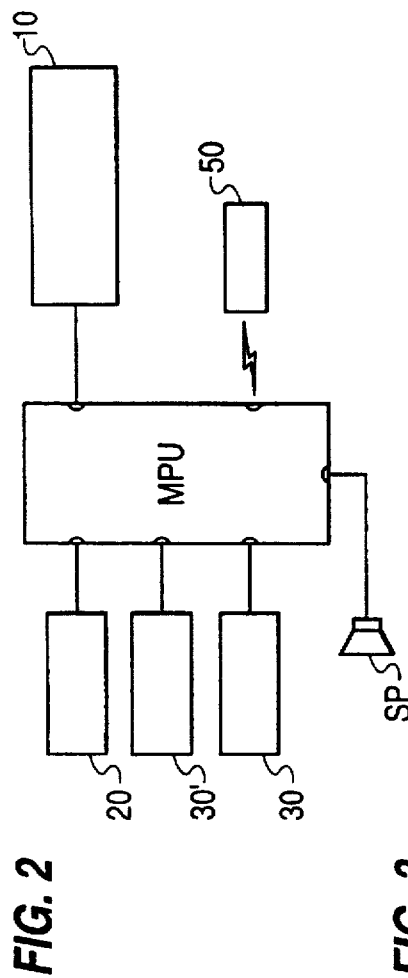

| FUNCTION KEY | ALPHABET KEY | DISEASE | ACUPUNCTURE POINTS | | PART OF BODY AFFECTED WITH DISEASE | DESCRIPTION OF SYMPTOM |
|---|---|---|---|---|---|---|
| | | | INSIDE OF LEFT HAND | OUTSIDE OF RIGHT HAND | | |
| F4 | A | COLD | E38, G11, C9, C5, A20, A16, A12, A8, A5, A4, E22, G11, C9, C5, E38 | J7, M30, D2, M6, B24, B19, D2, M30, J7, I14, I19 | LUNG → BRONCHI | THROAT PAIN, THROAT DRYNESS, ACUTE INFAMMATION OF UPPER RESPIRATORY TRACT, ETC. |
| | B | COUGH | F5, G13, C9, C1, A24, A22, A20, A18, A16, A12, A8, G13, C9, C5, C1, N18, F5 | J7, D7, B24, B19, M6, D7, J7, I14 | LUNG → BRONCHI | PRODUCTION OF SPUTUM DIFFICULTY OF BREATHING, ETC. |
| | C | BRONCHITIS | F5, E38, G13, C9, C5, C1, A24, A20, A18, A16 | D7, B17, B24, B19, I10, J7 | BRONCHI | COUGH, INCREASED PRODUCTION OF SPUTUM, ACCUMULATION OF SALIVA, MUCUS, AND ... |

APPARATUS FOR GUIDING HAND-ACUPUNCTURE

BACKGROUND OF THE INVENTION

The present invention concerns hand-acupuncture which is one of the oriental medical techniques, and more particularly an apparatus for guiding hand-acupuncture which may visually show the acupuncture points of a hand subjected to acupuncture to cure a disease, to relieve a pain or to improve general health.

Acupuncture is an oriental medical technique, which consists of inserting hair-thin needles through particular spots in the skin (acupuncture points) which are the inlets for a system of fine channels to medically communicate with parts of a human body. The acupuncture is essentially to cure or prevent a disease of a part of a human body or to improve the general health thereof.

In the field of acupuncture, the hand-acupuncture is based on the theory that a human hand is structured so as to correspond with the body and therefore has acupuncture points (hereinafter referred to as hand-acupuncture points) medically communicating with corresponding parts of the body. Hence, practicing the hand-acupuncture consists of inserting hair-thin needles through hand-acupuncture points in the skin of the hand in order to cure or prevent diseases of the body or to improve the general health thereof.

Generally the technique for practicing hand-acupuncture requires much time and painstaking effort to learn. Especially, it is too difficult to locate hand-acupuncture points to insert hair-thin needles, or even impossible without full attention. Many kinds of books and video tapes have been published in order to visually help locate the hand-acupuncture points by means of drawings indicating the hand-acupuncture points, but only giving a very limited effect. Moreover, whenever locating hand-acupuncture points, it is required to necessarily open the books or play the video tapes.

It is an object of the present invention to provide an apparatus for guiding hand-acupuncture which visually indicates hand-acupuncture points by means of electronic means.

It is another object of the present invention to provide an apparatus for guiding hand-acupuncture which comprises a human body model for visually indicating the parts of the body and hand models for visually indicating the hand-acupuncture points corresponding with the parts of the body.

It is still another object of the present invention to provide means for visually indicating disease affected parts of the body and the corresponding hand-acupuncture points by means of a code system whereby various kinds of diseases of the body and corresponding hand-acupuncture points are electronically coded.

SUMMARY OF THE INVENTION

According to an embodiment of the present invention, an apparatus for guiding hand-acupuncture comprises:

at least a hand model having a plurality of light emitting means respectively mounted in the spots corresponding to the hand-acupuncture points;

a human body model having a plurality of light emitting means mounted in the positions of the parts of a human body cured by practicing the hand-acupuncture to corresponding hand-acupuncture points;

a microprocessing unit programmed in a given code to represent the hand-acupuncture points corresponding with the parts of the body affected with various kinds of diseases;

an input means for entering code signals into the microprocessing unit according to the code system;

a connecting means for connecting the output signals of the microprocessing unit with the light emitting means; and a support frame for supporting the body model and hand model, wherein, if code signals are entered into the microprocessing unit according to the code system, the corresponding light emitting means of the body model and hand model are turned on to emit light under the control of the microprocessing unit.

The apparatus for guiding hand-acupuncture may also include sound means for voicing the informations of the disease represented by the light emitting means turned on. The light emitting means may be light emitting diode (LED). The input means preferably consists of the keyboard of a conventional computer or a remote controller. According to one aspect of the present invention, the body model is erected on the upper central region of the support frame with a hand model mounted on each side. It is preferable to classify the hand-acupuncture points into 12 groups according to disease, which groups are respectively assigned with the 12 function keys (F1–F12) of the computer keyboard.

BRIEF DESCRIPTION OF THE ATTACHED DRAWINGS

The present invention will now be described with reference to the drawings attached only by of example.

FIG. 1 is a perspective view for schematically illustrating an apparatus for guiding hand-acupuncture according to an embodiment of the present invention;

FIG. 2 is a block diagram for illustrating the fundamental principle of organizing the inventive apparatus for guiding hand-acupuncture; and FIG. 3 is a table for illustrating a kind of classification in which hand acupuncture points are classified according to human diseases into 12 groups each handled by one of the 12 function keys of an conventional computer keyboard.

DETAILED DESCRIPTION OF PREFERRED EMBODIMENTS

Referring to FIGS. 1 and 2, an apparatus for guiding hand-acupuncture includes at least a hand model 30, 30' having a plurality of light emitting diodes (LED) respectively mounted in the spots corresponding to the hand-acupuncture points, a human body model 20 having a plurality of LEDs mounted in the positions of the parts of a human body cured by practicing the hand-acupuncture to corresponding hand-acupuncture points, and a microprocessing unit (MPU).

The MPU is programmed in a given code to represent the hand-acupuncture points corresponding with the parts of the body affected with various kinds of diseases, and electrically connected with the LEDs, so that, if a code signal is entered by a computer keyboard 10 or remote controller 50 into the MPU according to the given code, the corresponding LEDs are turned on to emit light.

The body model is preferably erected on the upper central region a support frame with a hand mounted on each side, as shown in FIG. 1. The keyboard is attached to the front of the support frame. In addition, a sound system may be connected with the MPU so as to voice the informations of the disease represented by the light emitting means turned on. In this case, the informations about various diseases are programmed and stored into the MPU to control a speakers (SP).

FIG. 3 illustrates an example where hand-acupuncture points are classified and coded according to disease, so that the informations of the positions of the hand-acupuncture points may be entered as data signals into the MPU. In the present embodiment, the hand-acupuncture points are classified into 12 groups according to disease, which groups are respectively assigned with the 12 function keys (F1–F12) of the computer keyboard. Again each of the groups is divided into subgroups, each of which represents a particular disease assigned with one of the alphabet keys. For example, cold is represented by the key "A" in the group indicated by the function key "F4", as shown in FIG. 3. Of course, this kind of classification is arbitrarily chosen, and therefore it will be self-evident that any kind of classification may be used to associate the hand-acupuncture points with combinations of keys of the keyboard.

Describing the operational sequence of the inventive apparatus, firstly pushed is the function key representing the group to which a particular disease to cure or prevent belongs, and then the alphabet key representing the disease. Accordingly, the key combination signal is entered into the MPU to turn on the corresponding LEDs of the body model 20 and hand model 30, 30' to emit light and the speaker (SP) to voice the information of the disease.

For example, if the disease is cold represented by alphabet key "A" in the group indicated by function key "F4", the function key "F4" is firstly pushed and then the alphabet key "A" generating a unique key combination signal entered into the MPU to turn on the corresponding LEDs of the hand model 30, 30' and body model 20 to emit light and the speaker to voice the information of the disease. Thus, the positions of the LEDs emitting light just represent the hand-acupuncture points, into which hair-thin needles are inserted.

What is claimed is:

1. An apparatus for guiding hand-acupuncture comprises:
    a support frame,
    at least a three-dimensional hand model having a plurality of light emitting means respectively mounted in the spots corresponding to the hand-acupuncture points and extending from said support frame;
    a three dimensional human body model having a plurality of light emitting means mounted in the positions of the parts of a human body cured by practicing said hand-acupuncture corresponding to said hand-acupuncture points and extending from said support frame;
    a microprocessing unit programmed in a given code to represent said hand-acupuncture points corresponding with the parts of the body affected with various kinds of diseases;
    an input means for entering code signals into said microprocessing unit according to said code;
    a connecting means for connecting the output signals of said microprocessing unit with said light emitting means; and
    wherein, if code signals are entered into said microprocessing unit according to said code, the corresponding light emitting means of said body model and hand model are turned on to emit light under the control of said microprocessing unit.

2. An apparatus for guiding hand-acupuncture as defined in claim 1, further including sound means for voicing information on a disease represented by the light emitting means turned on.

3. An apparatus for guiding hand-acupuncture as defined in claim 1 or 2, wherein said light emitting means are light emitting diodes (LEDs).

4. An apparatus for guiding hand-acupuncture as defined in claim 1 or 2, wherein said input means consists of a computer keyboard or remote controller.

5. An apparatus for guiding hand-acupuncture as defined in claim 4, wherein said keyboard is integrally formed with said support frame.

6. An apparatus for guiding hand-acupuncture as defined in claim 1, wherein said body model is erected on the upper central region of said support frame and extends therefrom, with a hand model mounted on each side of said body model and extending from said support frame.

7. An apparatus for guiding hand-acupuncture as defined in claim 4, wherein said keyboard is attached to the front of said support frame and said body model is erected on the upper central region of said support frame with a hand model mounted on each side.

8. An apparatus for guiding hand-acupuncture as defined in claim 5, wherein said hand-acupuncture points are classified into 12 groups according to disease, said groups being respectively assigned with the 12 function keys (F1–F12) of said computer keyboard.

9. An apparatus for guiding hand-acupuncture as defined in claim 7, wherein said hand-acupuncture points are classified into 12 groups according to disease, said groups being respectively assigned with the 12 function keys (F1–F12) of said computer keyboard.

* * * * *